(12) United States Patent
Bristow et al.

(10) Patent No.: US 6,922,551 B1
(45) Date of Patent: Jul. 26, 2005

(54) INTERFERENCE PREVENTION IN A RADIO COMMUNICATIONS SYSTEM

(75) Inventors: Robert Owen Bristow, Basingstoke (GB); Sven Mattisson, Bjarred (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 09/743,642

(22) PCT Filed: Jul. 5, 1999

(86) PCT No.: PCT/EP99/04666

§ 371 (c)(1),
(2), (4) Date: Apr. 11, 2001

(87) PCT Pub. No.: WO00/04658

PCT Pub. Date: Jan. 27, 2000

(30) Foreign Application Priority Data

Jul. 15, 1998 (GB) .............................................. 9815391

(51) Int. Cl.⁷ ................................................ H04B 1/02
(52) U.S. Cl. ...................................... 455/103; 455/561
(58) Field of Search ................................ 455/103, 561,
455/101, 63.1, 296, 278.1, 114.2, 1, 464,
69, 552, 434, 455, 518, 519, 447, 20, 63.3,
703; 370/321, 335, 442

(56) References Cited

U.S. PATENT DOCUMENTS

| | | | | |
|---|---|---|---|---|
| 5,179,722 A | | 1/1993 | Gunmar et al. ............ 455/33.1 |
| 5,351,270 A | | 9/1994 | Graham et al. ................. 375/1 |
| 5,355,522 A | | 10/1994 | Demange ..................... 455/62 |
| 5,428,824 A | | 6/1995 | Kasai .......................... 455/78 |
| 5,471,146 A | * | 11/1995 | Krayeski et al. ............ 324/637 |
| 5,603,093 A | | 2/1997 | Yoshimi et al. ............... 455/63 |
| 5,649,303 A | * | 7/1997 | Hess et al. ................. 455/63.3 |
| 5,708,969 A | * | 1/1998 | Kotzin et al. ............... 455/423 |
| 5,737,359 A | | 4/1998 | Koivu ......................... 375/202 |
| 5,796,760 A | * | 8/1998 | Wiedeman et al. ......... 375/130 |
| 5,896,375 A | * | 4/1999 | Dent et al. .................. 370/347 |
| 5,995,533 A | * | 11/1999 | Hassan et al. .............. 375/140 |
| 6,006,100 A | * | 12/1999 | Koenck et al. ............. 455/466 |
| 6,112,098 A | * | 8/2000 | Flint et al. .................. 455/464 |
| 6,259,898 B1 | * | 7/2001 | Lewis ......................... 455/103 |
| 6,628,927 B1 | * | 9/2003 | Samuels ....................... 455/77 |
| 2002/0082019 A1 | * | 6/2002 | Sunay et al. ................ 455/442 |

FOREIGN PATENT DOCUMENTS

| | | |
|---|---|---|
| EP | 720407 | 7/1996 |
| EP | 0 781 066 A2 | 6/1997 |
| GB | 2 228 101 A | 10/1995 |
| WO | WO 89/04569 | 5/1989 |
| WO | WO 91/12675 | 8/1991 |
| WO | WO 91/12676 | 8/1991 |
| WO | WO 92/22963 | 12/1992 |
| WO | WO 95/08246 | 3/1995 |
| WO | WO 95/09512 | 4/1995 |
| WO | WO 96/04760 | 2/1996 |
| WO | WO 96/06509 | 2/1996 |
| WO | WO 96/31009 | 10/1996 |
| WO | WO 96/34501 | 10/1996 |
| WO | WO 97/23109 | 6/1997 |

OTHER PUBLICATIONS

López Márquez, T., International Search Report, International Appl. No. PCT/EP99/04666, Nov. 8, 1999, pp. 1–3.
UK Patent Office Search Report pertaining to GB 9815391.9; completed by Nigel Hall on Dec. 10, 1998. Novelty Search.

* cited by examiner

*Primary Examiner*—Nay Maung
*Assistant Examiner*—Tu X Nguyen
(74) *Attorney, Agent, or Firm*—Jenkens & Gilchrist, P.C.

(57) ABSTRACT

In a radio communications unit with several transceivers communicating in different frequency bands, a signal parameter of a selected channel is monitored in order to detect interference due to intermodulation products. The select channel is for example used by a long range radio communications link and the interfering channel on a short range radio link. Once the channel causing interference has been identified, transmissions on it are prevented.

5 Claims, 1 Drawing Sheet

US 6,922,551 B1

INTERFERENCE PREVENTION IN A RADIO COMMUNICATIONS SYSTEM

TECHNICAL FIELD OF THE INVENTION

This invention relates to a radio communications unit, and in particular to a unit of the type which communicates over a network with a satellite or cellular system, and which communicates over a short range radio link with a remote unit such as a portable handset. In particular, the invention relates to a unit of this type in which interference, on a channel over which the unit communicates with the network, caused by transmissions on the short range radio link, can be avoided.

BACKGROUND OF THE INVENTION

Radio communication units have been proposed, having one transceiver for communicating over, say, a satellite network, and a second transceiver for communicating over a short range radio link with a remote unit such as a portable handset.

A potential problem with such units is that, if there is a third party transmitter located close to the unit, or to the remote handset, operating in a nearby frequency band, it may together with the transmitter on the short range link produce intermodulation products which can interfere with reception of signals on the long range communications link. Typically, the short range radio link uses a frequency hopping system, in which communications are transmitted over a large number of channels, which are used in sequence. It is probable that only one of these channels will, together with the third party signal, produce an interference signal on the channel used by the long range radio link.

Various systems are known for avoiding interference. For example, EP-0781066 describes an arrangement in which interference signals are monitored on a number of channels, and channels with unacceptably high levels of interference are not used. WO95/08246 discloses a frequency hopping system, in which interference levels are monitored on the available channels and, if it is determined that the interference level on a channel is high, this channel can be discarded from the frequency hopping sequence which is used.

Thus, these systems involve detecting interference on a particular channel and, when interference is detected, avoiding the use of that channel.

SUMMARY OF THE INVENTION

In accordance with the invention, the problem which is sought to be solved involves interference on a channel used by one transceiver, caused by transmissions on a different channel by another transceiver.

In accordance with the invention, the interference is detected on one channel, for example used by a long range radio communications link and, if interference is detected, use of another channel, for example on a short range radio link, which is causing that interference signal to appear is suspended.

This allows the unit to continue communications with the network on the already allocated channel, altering only the pattern of communications on the short range radio link.

A BRIEF DESCRIPTION OF DRAWINGS

DETAILED DESCRIPTION OF PREFERRED EMBODIMENTS

Figure 1:
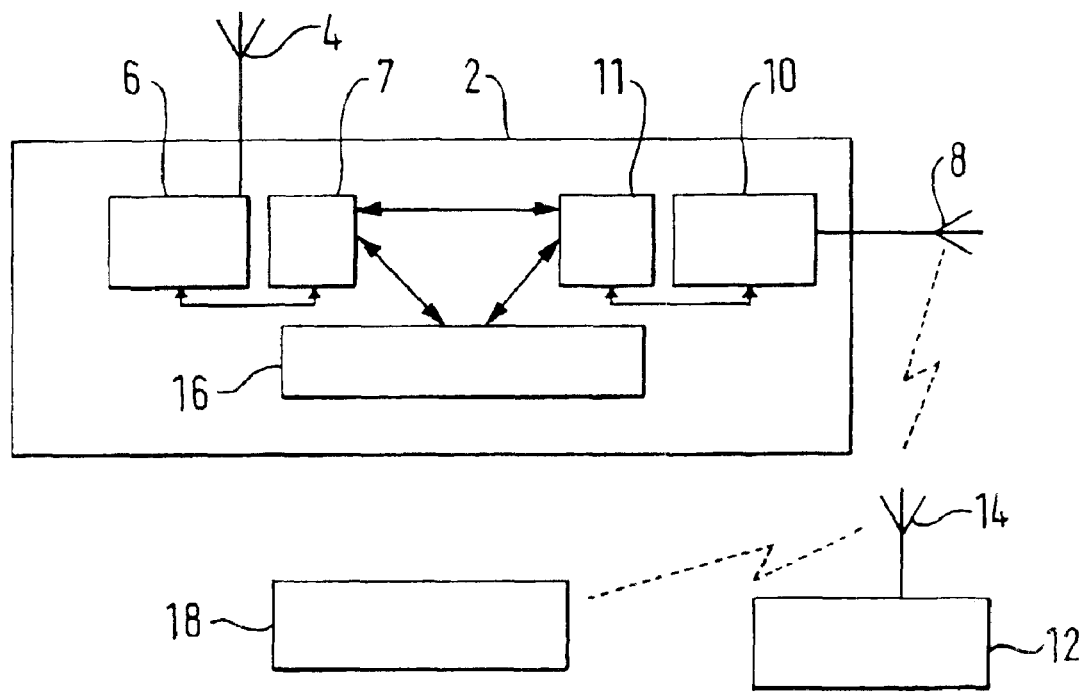
FIG. 1 is a block schematic diagram of a radio communications unit in accordance with the invention.

FIG. 1 shows a system in accordance with the invention. A radio communications unit 2 includes a first antenna 4, connected to transceiver circuitry 6, for communication over a radio communications network. In this illustrated embodiment of the invention, the transceiver circuitry 6, and antenna 4, are adapted for communication over a satellite network, transmitting signals to and receiving signals from low orbit satellites, with received radio frequency signals in the range from 2480 MHz to 2500 MHz.

However, it will be appreciated that the invention is applicable to systems operating over other radio communications networks, for example cellular networks.

The transceiver module 6 is connected to a baseband and control module 7, to which it sends received data signals, and from which it receives data signals for transmission and tuning and power control data.

The unit 2 further comprises a second antenna 8, and transceiver circuitry 10, for communications over a short range radio link. The transceiver module 10 is connected to a baseband and control module 11, to which it sends received data signals, and from which it receives data signals for transmission and tuning and power control data. The baseband modules 7, 11 are connected together for the transfer of voice or other signals received on one RF link for transmission on the other RF link.

FIG. 1 also shows a portable handset 12, having an antenna 14, for communication over the short range link with the unit 2.

Although in this illustrated embodiment the unit 12 is described as a portable handset, it will be appreciated that this unit may be any device which is located remotely from the main unit 2, or at least is movable relative thereto.

The system 2 further comprises a controlling and interfacing unit 16, which controls the overall operation of the device, and, in particular, sends and receives signals to and from the baseband and control modules 7, 11. Specifically, the control unit 16 receives data from the satellite baseband and control module 7, relating to the satellite link, such as the quality of the link and the channels which are in use. The control unit 16 then includes the relevant circuitry for detecting interference as discussed below, and issuing control signals, in particular for the control of the short range link. The baseband modules 7, 11 and control unit 10 may be separate only in the software domain, without being separate physical devices.

The short range radio link, between the main unit 2 and remote unit 12, operates in the Industrial Scientific and Medical (ISM) band of the radio frequency spectrum, from 2400 MHz to 2480 MHz (see document IEEE 802.11). This has the advantage that, in many countries, users do not need to be licensed. However, a consequence of this is that signals may need to be transmitted in the presence of large interfering signals in the same band. For example, there may be other nearby communications users, but even microwave ovens can transmit relatively large signals in this frequency band.

FIG. 1 shows such a source 18 of interfering signals.

In order to allow the short range radio link to operate successfully in the presence of such potentially interfering signals, it uses a frequency-hopping spread spectrum (FH- CDMA) system. This means that there are a large number (perhaps 50 or 100 or more) of channels allocated for transmissions on the link, and the transmissions take place on each of these channels in succession, using a predetermined pseudorandom sequence. In a preferred embodiment of the invention, 80 such channels are used. Although there may be interference on a small number of the channels which are used, only a small proportion of the total data will be lost. Then, data interleaving, and error correction, can be used to ensure that errors as a result of the interference do not occur together in bursts within the received signal, and can be compensated.

However, this does not apply to the transmissions sent to the satellite network, which use direct sequence spread spectrum (DS-CDMA), operating on a single channel at a time.

Figure 2:
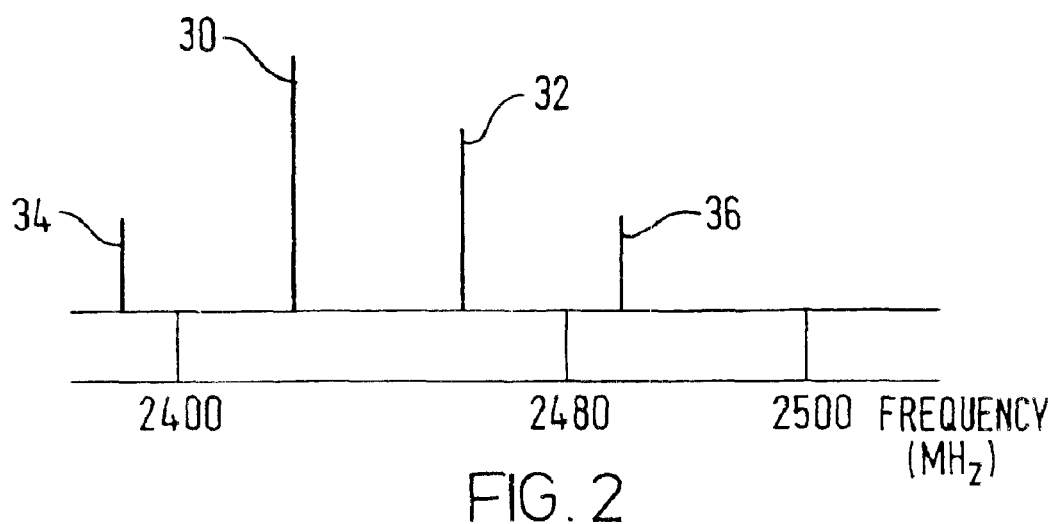
FIG. 2 illustrates the frequency bands used by the unit, and the signals appearing therein.

FIG. 2 is a representation of the relevant part of the frequency spectrum, illustrating the relevant signals. As mentioned above, the ISM band, in which the short range radio link transmits, is from 2400 MHz to 2480 MHz. The transceiver 6 receives signals from the satellite on a channel in the frequency range from 2480 MHz to 2500 MHz.

As also mentioned above, the short range radio link operates on a frequency hopping principle, which means that it uses a large number of channels in the relative frequency band, in predetermined sequence, each for only a short time. FIG. 2 shows a signal 30 appearing at one such frequency in the ISM band. Also shown in FIG. 2 is a signal 32, appearing at a different frequency in the ISM band. As mentioned above, this signal may be transmitted by another unlicensed communications user, or may even be emitted by a non-communications source, such as a microwave oven.

As is known, nonlinearities in the RF components of the receivers will cause intermodulation products to be developed when the signals 30, 32 are combined. The third order intermodulation products, indicated in FIG. 2 by the reference numerals 34, 36, will appear to either side of the two original signals 30, 32.

Thus, as shown in FIG. 2, the intermodulation product 36 appears in the receive band of the transceiver 6. Therefore, assuming that the signal 32 is at a constant frequency, then, as the frequency of the signal 30 hops from one channel to another, the intermodulation product signal 36 will appear at different channels in the same sequence.

When the intermodulation product signal 36 appears on a channel on which the transceiver 6 is attempting to receive signals, it will cause severe interference with those signals. Moreover, because the transceiver 6 is receiving on a constant frequency this will cause data to be lost.

In accordance with the invention, therefore, steps are taken to prevent transmission on the relevant channel in the ISM band which is causing the intermodulation products to appear at the channel which is in use by the satellite transceiver 6.

The first stage is to identify the relevant channel in the ISM band which is causing the interference to appear on the satellite channel which is in use. There are many ways in which this can be done.

For example, the quality or signal strength of signals received by the transceiver 6 can be monitored in the control unit 16, and the time history of these measurements can be compared with the known frequency hopping sequence of transmissions on the short range radio link. The channel or channels which are causing the interference on the satellite link can be detected by noting the short range link channels which are in use at the times when the reception quality on the satellite link is poor or the received signal strength is low.

As a second possibility, the average signal quality or signal strength, of signals received at the transceiver 6, could be measured in the control unit 16. The control unit 16 can then send control signals to the transceiver 10, suspending transmissions on each of the available channels in turn. During a period in which all of the available channels, except one which results in the appearance of an interfering intermodulation product, are used, the average received signal strength and signal quality will be higher than during a period in which such a channel is used. It is therefore possible to determine in the control unit 16 which channels on the short range radio link are responsible for the interference on the satellite link.

As a third possibility, the control unit 16 can control transmissions from the transceiver 10, in order to make a small change in the power of the signals transmitted thereby. At the same time, if the control unit 16 monitors the power level of signals received in the satellite transceiver unit 6, the relevant interaction mechanism can be deduced. Thus, the transmit level could be shifted slightly on each complete cycle of the frequency hopped sequence, so that, if one channel was causing the problem, the interference would move up and down slightly for each cycle of the sequence. For example, we could hold all the frequency hopping channels constant in level, but every time we got to channel 12 (say), we could alter the level up and down alternately by 1 dB. Then, if the interference was caused by this channel the interferer would move up and down at a rate equal to the repetition rate of the frequency hopping cycle. We could then effectively probe each of the channels in sequence.

Alternatively, to save having to wait for each complete frequency hopping sequence to finish, we could alternately switch the transmit level on a given channel up and down slightly each time we transmitted on that channel, and then correlate the changes in interferer level with the use of this channel.

A further possibility is to apply an encoded modulation to signals transmitted on the short range radio link. For example, a low frequency AM signal could be applied to the transceiver. Such a modulation would have a negligible effect on the reception of the signals at the remote unit 12, but would be translated on to the intermodulation products resulting from combination with the third party signal. Therefore, if the control unit 16 looks for such a code in signals received at the transceiver 6, the presence of such a code will indicate the presence of an interfering intermodulation product, and the code can be used to identify the channel of the short range link which has resulted in that signal. Alternatively, the encoding applied to the signal on the short range link could be a small frequency or phase modulation. Further, the interference phase modulation could be correlated with the modulation pattern of the short range link. If there is any correlation, this can be used to determine that the interference originals in the short range link.

Once it has been determined in the control unit 16 which channel or channels on the short range radio ink are responsible for the creation of intermodulation products which interfere with transmissions on the satellite link, action can be taken to prevent further transmissions on that frequency.

A preferred possibility is simply to send a control signal from the control unit 16 to the transceiver 10, preventing further transmissions on that channel. This will cause data, intended to be transmitted on that channel, to be lost, but, if the data are adequately interleaved, this will be no problem, in the same way that interleaving and error correction can avoid significant loss of data if there is interference on one of channels in the frequency hopped sequence itself. Moreover, this has the advantage that the remote receiver 12 can operate in the usual way.

An alternative is to send a signal from the control unit 16 via the transceiver 10 to the remote unit 12, indicating the channels on which communication is to be suspended, and to negotiate a new hopping sequence between the transceivers 10, 12, which avoids the relevant channel or channels.

The result is that there are no transmissions on the channel or channels which cause intermodulation products to appear on the channel of the satellite receiver which is in use, and the overall signal quality of transmissions on that link will therefore be improved.

The monitoring steps described above can be repeated at regular intervals as often as is required, for example every 30 seconds, to detect interfering intermodulation products. Alternatively, the overall signal quality or signal strength can be monitored continuously, and steps can be taken to detect interfering intermodulation products only when it is determined that the overall signal quality of signal strength has fallen below a particular threshold.

There is therefore described a system which allows improved communication with a satellite network in the presence of an interfering signal, without requiring the unit to change the channel on which is communicating with the satellite network.

What is claimed is:

1. A radio communications unit, comprising:

a first transceiver for communicating on a selected one of a plurality of channels in a first radio frequency band;

a second transceiver, separate from the first transceiver, for communicating on channels in a second radio frequency band, communications taking place on a plurality of channels sequentially;

means for detecting interference on the selected channel in the first radio frequency band, caused by transmissions on an identified channel in the second radio frequency band; and means for preventing transmissions on the identified channel.

2. A radio communications unit as claimed in claim 1, wherein the means for detecting interference on the selected channel comprises means for monitoring a signal parameter on the selected channel, and means for comparing the time history of these measurements with the known sequence of transmissions in the second radio frequency band.

3. A radio communications unit as claimed in claim 1, wherein the means for detecting interference on the selected channel comprises means for monitoring an average value of a signal parameter of signals received on the selected channel, and means for temporarily suspending transmissions on each of the available channels in the second radio frequency band in turn.

4. A radio communications unit as claimed in claim 1, wherein the means for detecting interference on the selected channel comprises means for varying signals transmitted in the second radio frequency band, and means for detecting resulting variations in signals detected on the selected channel.

5. A method of controlling a radio communications unit comprising a first transceiver for communicating on a selected one of a plurality of channels in a first radio frequency band and a second transceiver, separate from the first transceiver, for communication on channels in a second frequency band, communications taking place on a plurality of channels sequentially, the method comprising:

detecting interference on the selected channel in the first radio frequency band caused by transmissions on an identified channel in the second radio frequency band; and preventing transmission on the identified channel in the event that interference is detected.

\* \* \* \* \*

UNITED STATES PATENT AND TRADEMARK OFFICE
CERTIFICATE OF CORRECTION

PATENT NO. : 6,922,551 B1
DATED : July 26, 2005
INVENTOR(S) : Robert Bristow et al.

It is certified that error appears in the above-identified patent and that said Letters Patent is hereby corrected as shown below:

<u>Column 6,</u>
Line 28, replace "communication" with -- communicating --.

Signed and Sealed this

Thirtieth Day of May, 2006

JON W. DUDAS
*Director of the United States Patent and Trademark Office*